United States Patent [19]
Davis

[11] 3,718,688
[45] Feb. 27, 1973

[54] ALKYLIDINE AND ARYLIDINE AMINO ACID ESTERS, AND ALKYL AND ARYL AMINO ACID ESTERS

[76] Inventor: Jefferson W. Davis, c/o Radio-Carbon Lab., 1012 Washington Street, San Carlos, Calif. 94070

[22] Filed: Oct. 18, 1967

[21] Appl. No.: 676,057

[52] U.S. Cl. ...260/482 R, 260/326.14 T, 260/326.3, 260/471 R, 260/481 R, 260/482 P
[51] Int. Cl. ............................................C07c 101/14
[58] Field of Search......260/471 A, 482 R, 326.14 T, 260/326.3, 471 R, 481 R, 482 P

[56] References Cited

UNITED STATES PATENTS

| | | | |
|---|---|---|---|
| 3,361,626 | 1/1968 | Harris et al. | 260/482 R |
| 3,419,525 | 12/1968 | Aelony | 260/482 R |

OTHER PUBLICATIONS

Fieser, L. F. et al., Organic Chemistry, 1956, pub. by Reinhold Pub. Corp. of New York, pages 211 to 214.

*Primary Examiner*—Henry R. Jiles
*Assistant Examiner*—L. Arnold Thaxton
*Attorney*—Julian Caplan

[57] ABSTRACT

Several series of new organic compounds and methods of preparing same are disclosed. These include compounds of the general formula for alkylidine and arylidine amino acid esters:

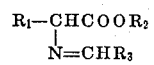

and the general formula for alkyl and aryl amino acid esters:

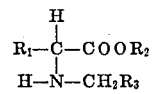

For both these formulas, $R_1$ and $R_3$ are each of the group consisting of H, an aryl or alkyl radical, with or without other functional groups and $R_2$ is an alkyl radical or aryl radical with or without functional groups. The compounds are useful for identification of amino acids by gas liquid chromatography and as pharmaceuticals, and for the separation of L-amino acids from natural sources, such as protein and peptide hydrolysates.

3 Claims, No Drawings

ALKYLIDINE AND ARYLIDINE AMINO ACID ESTERS, AND ALKYL AND ARYL AMINO ACID ESTERS

The present invention relates to compounds of the general formulas set forth in the abstract of disclosure. The invention further relates to methods of preparing such compounds and also for separating mixtures of amino acids by first preparing such compounds, fractionally distilling same and then obtaining free pure amino acids from the distillates.

Gas liquid chromatography identification of amino acids has heretofore been a complex and time-consuming operation because of difficulties with volatility and separability of derivatives when such acids have reacted with other reagents. The esters of the present invention, however, have unusually sharp boiling ranges and show no sign of decomposition during chromatographic analysis. Accordingly, a principal function of the present invention is in the identification of amino acids for chemical research, pharmacology, interstellar investigation, and many other purposes.

Still another feature of the invention is in the manufacture of pure amino acids. Protein hydrolysates containing pluralities of amino acids and derivatives are converted to mixtures of the compounds of the present invention. Because of the sharp boiling point ranges of these compounds, fractional distillation of the mixtures yields quite pure ester compounds. The latter are then treated with acids or bases to yield amino acids in relatively free form. Such separation has not heretofore been accomplished in such rapid and economical manner.

The foregoing and other objects and advantages of the invention will be apparent to those skilled in this art by consideration of the following examples:

EXAMPLE 1

To an amino acid methyl ester was added an aldehyde. The mixture was dissolved in a non-polar solvent containing a drying agent and the drying agent separated by filtration. The product was distilled to yield an alkylidine amino acid ester, a Schiff base. More specifically, at room temperature and atmospheric pressure, to 17 parts (by weight, throughout this specification) of leucine methyl ester was added ten grams isobuteraldehyde, with stirring. The mixture became warm and small droplets of water formed. A non-polar solvent, such as methylene chloride, was added together with a drying agent, such as Na, Mg or Ca sulphate in sufficient quantity to remove the water formed. After standing a few minutes, the solution was separated by filtration, concentrated at a reduced pressure, such as 15 mm., and distilled to give 19.1 grams of isobutylidine leucine methyl ester, a colorless oil boiling at 103°–104° C. at 15 mm. pressure.

By using a corresponding quantity of other appropriately esterified amino acid in place of leucine methyl ester, the same method has been used to produce the designated products in Table I. Additional arylidine products are shown in Table II. It will be understood, of course, that the aldehyde was appropriately varied in instances where other than the isobutylidine product is shown.

The amino acid ethyl esters when reacted with an aldehyde yield more stable compounds than the corresponding methyl esters. The amino acid ethyl esters are thus useful in gas liquid chromatography. More specifically, alanine ethyl ester was treated in the same manner as the leucine methyl ester of the preceding example to produce isobutylidine alanine ethyl ester. Gas liquid chromatography of the product yielded a sharp peak and thus the product is useful as a standard in gas liquid chromatography of amino acids.

The ilidine amino acid methyl esters tend to decompose in some of the commercially available gas liquid chromatogrophy equipment and hence it may be desirable to reduce the ilidine compounds to the alkyl and aryl amino acid esters, as in Example 2, prior to chromatography. However, in chromatography equipment where metal is not used in construction or where the metal does not tend to catalyze the decomposition of the methyl esters of the amino acids, then ilidine compounds of amino acid methyl esters may be used directly in gas liquid chromatography.

The same method was used in the other esters of amino acids.

EXAMPLE 2

The compounds of Example 1 were reduced. As a first step they were dissolved in an alcohol corresponding to the ester function in which was suspended zinc dust or tin metal, stirred and held at reduced temperature and HCl added until the zinc (or tin) was dissolved. The solution was concentrated to a syrup, cooled, and concentrated ammonia added. The liberated oil was extracted into a non-polar solvent. The product was fractionally distilled to yield an alkyl or aryl amino acid ester.

More specifically, at room temperature and atmospheric pressure, ten parts of isobutylidine leucine methyl ester was dissolved in 200 parts of absolute methanol in which was suspended 20 parts of zinc dust or tin metal. (Where an ethyl ester was used, the alcohol was ethanol, and similar corresponding alcohols used for the various esters). While stirring vigorously, the temperature was held below 10° C. by use of ice or other cooling means, and dry HCl or HBr was passed into the solution until all zinc or tin had dissolved. The solution was concentrated to a syrup at reduced pressure, such as 15 mm., and about 35° C. The syrup was treated with ice and concentrated ammonia, and the liberated oil extracted into a solvent such as methylene chloride, ethyl ether or other non-polar solvent. After removal of the solvent and fractionation of the residue, there was obtained 8.2g. of N-isobutyl leucine methyl ester which boiled at 101°–102° C. at 15 mm. pressure.

Gas liquid chromatography of the foregoing gave very sharp peaks. The compounds are therefore useful as standards in the gas liquid chromatography of amino acids.

By methods similar to the above and by starting with a corresponding quantity of other appropriately esterified amino acid and the alcohol corresponding to the ester function, there have been produced the designated alkyl and aryl products listed in Table I.

These compounds likewise produced excellent peaks in gas liquid chromatography.

The ilidine compounds when reduced in the presence of an excess of aldehyde gave dialkyl or diaryl or arylalkyl amino acid esters. The latter are also useful in gas liquid chromatography.

EXAMPLE 3

The compounds of Example 2 were dissolved in alcohol containing base or acid, then neutralized to give the free amino acid derivatives. More specifically, 5 parts N-isobutyl leucine methyl ester was dissolved in 25 parts of ethanol or other alcohol containing a slight excess (e.g. 26 parts) of either a base, such as NaOH, or an acid such as HCl, HBr or $H_2SO_4$, and the mixture warmed on a water bath to a temperature of about 80° C. for about 15 minutes. The solution was then made neutral and the white solid, N-isobutyl leucine, having a M.P. of 260°–262° C, was obtained.

The method is also useful for production of other N-alkyl or N-aryl amino acids.

EXAMPLE 4

A protein hydrolysate containing a mixture of amino acid derivatives was esterified and then processed substantially as in Example 1. The mixture of esters was fractionally distilled to separate out the various amino acid derivatives present.

More specifically, a protein such as 100 parts gelatin was converted to the free amino acid hydrochlorides by boiling for about 12 hours with 375 parts of approximately eight normal aqueous hydrochloric acid. The hydrolysate was treated with charcoal and filtered and the filtrate evaporated to dryness under a reduced pressure, such as 15 mm. The residue was suspended in 500 parts of methanol or other suitable alcohol and saturated with dry hydrogen chloride or hydrogen bromide. The solution was heated on a water bath at about 60° C. for about one hour and the alcohol removed by evaporation at about 15 mm. The residue was then suspended in 1000 parts methylene chloride or other chlorinated solvent and with vigorous stirring and cooling to about 10° C. saturated with anhydrous ammonia. The ammonium chloride was removed by filtration and the filtrate concentrated at 15 mm. The remaining oil was treated with 125 parts of isobutyraldehyde. After a few minutes 500 parts of methylene chloride or ether or other non-polar solvent was added, along with approximately 60 parts of sodium sulphate. After filtration the solution was concentrated and fractionally distilled at about 0.1 mm. pressure.

Accordingly, the derivatives of the various amino acid derivatives of proteins may conveniently be separated. Each such derivative may then be converted to other compounds of the original acid, as by Example 6.

EXAMPLE 5

A mixture containing ten grams each of the methyl ester hydrochlorides of alanine, glycine, leucine, isoleucine, valine, threonine, serine, glutamic acid, aspartic acid, tyrosine, tryptophan, arginine, lysine, ornithine, proline, hydroxyproline, cysteine, cystine, methionine and phenylalanine was treated with sodium hydroxide until the solution was basic, while keeping the solution between 0° and 10° C. Other organic or inorganic bases such as potassium hydroxide, ammonia, pyridine quinoline or triethyl or trimethyl amine may be used. The cold solution (15° to 20° C.) was extracted thoroughly with isobutyraldehyde, 3 to 4 times with 300° C. each time. The isobutyraldehyde extract was dried over sodium sulphate, and after filtration the excess aldehyde removed under reduced pressure, 15 mm., (water pump). The residue was fractionated to give the isobutylidine methyl esters of the following amino acids in 60–80 percent yields:

Alanine, B.P. 74°–75° C. 15 mm;
Glycine, B.P. 77°–78° C. 15 mm;
Valine, B.P. 92°–93° C. 15 mm;
Leucine and Isoleucine, B.P. 103°–105° C. 15 mm;
Serine and Threonine, 64°–65° C. 0.1 mm;
Cysteine, B.P. 73°–74° C. 0.1 mm;
Methionine, B.P. 80°–81° 0.1 mm;
Aspartic acid, B.P. 85°–86° C. 0.1 mm;
Glutamic acid, B.P. 100°–101° C. 0.1 mm;
Phenylalanine, B.P. III°–112° C. at 0.1 mm;
Lysine (mono) and Ornithine (mono), 124°–127° C. at 0.1 mm.

Proline, hydroxyproline, cystine and arginine react only on long contact with the aldehyde and were recovered from the extracted water solution as the free acids by conventional methods. Tyrosine, B.P. 176°–177° C. 0.1 mm. and Tryptophan, B.P. 189°–190° C. 0.1 mm. were recovered from the pot from the distillation by short path distillation in yields of about 50 percent. No histidine was recovered.

The operating procedures were as follows:

Procedure A. In water solution: The ester salts were poured over crushed ice and the base added until pH8 was reached. The extraction procedure was carried out at once.

Procedure B. In organic solution: The ester salt was poured into a suitable solvent and a mixture of the amine and aldehyde added all at once. After standing for a few minutes the solution was washed with water and the organic layer dried over sodium sulphate or other drying agent. After separation from the drying agent, excess aldehyde was removed under reduced pressure and the residual ilidine esters distilled. The results were essentially the same in both cases.

EXAMPLE 6

The arylidine or alkylidine amino acid esters were converted to the free amino acids and the aldehyde as follows by using base or acid:

The alkylidine or arylidine amino acid ester was treated with acid and the mixture steam distilled until no more aldehyde passed over. Upon evaporation of the residue the pure amino acid salt was obtained. The free amino acid was obtained from these salts by conventional means. More specifically:

a. 10 parts of isobutylidine glycine methyl ester was dissolved in water containing 10 parts of hydrochloric acid and steam passed through the solution until isobutyraldehyde no longer passed over. Upon evaporation of the residue, glycine hydrochloride was obtained in quantitative yield. The same was accomplished by boiling the mixture for half an hour, removing the aldehyde by extraction or distillation and evaporation of the residue to dryness. The free amino acid salts of all the other derivatives were obtained in a similar manner.

b. 10 parts of isobutylidine glycine methyl ester is dissolved in water containing 10 parts of NaOH (or KOH etc.) and the solution boiled for half an hour. The aldehyde was removed and the water solution containing the salt of the amino acid was made neutral and the amino acid isolated by conventional means.

EXAMPLE 7

The esters of Example 1 may be converted to the N-isobutyl compounds of amino acids. More specifically, 5 parts of isobutylidine valine methyl ester was dissolved in 100 parts of absolute methanol, or other alcohol, in which is suspended a catalyst, such as 0.2 parts of platinum (or other noble metal) oxide. The mixture was hydrogenated at 45 psi until no more hydrogen was absorbed. The catalyst was removed by filtration, the solution concentrated under a reduced pressure, such as 15 mm., and the oil fractionated to give 4.1g of N-isobutyl valine with B.P. 77°–78° C at 15 mm. pressure. The same method was used to produce corresponding compounds of the other amino acids, with the exception of cysteine and methionine (i.e. - amino acids which contain sulphur and affect the catalyst).

EXAMPLE 8

This example used a catalyst different from that of Example 7, but is in other respects similar. More specifically, 5 parts of isobutylidine valine methyl ester was dissolved in 100 parts of absolute methanol or other alcohol, in which was suspended 7 parts of freshly prepared Raney nickel. The mixture was hydrogenated at 45 psi until no more hydrogen was absorbed. The catalyst was removed by filtration, the solution concentrated under reduced pressure and the oil fractionated to give 3.8g of N-isobutyl valine with B.P. of 77°–78° C. at 15 mm. pressure. The same method was used to produce corresponding compounds of the other amino acids, including cysteine and methionine.

EXAMPLE 9

Reduction of the ilidine compounds without use of a catalyst may be accomplished with use of formic acid. For example, 10g of isobutylidine valine methyl ester was dissolved in 20 g. of 99 percent formic acid and the mixture was heated to 75°–85° C. until evolution of $CO_2$ ceased. Upon fractionation of the mixture, isobutyl valine methyl ester was obtained in a yield of over 90 percent. Other ilidine esters gave similar results.

EXAMPLE 10

This example demonstrates the separability and identification of the alkylidine and arylidine amino acid esters as prepared in Example 2, Example 7, and Example 8, by means of gas liquid chromotography. More specifically, using a capillary carbowax column 0.02 in. by 150 ft. and $N_2$ as carrier gas, 0.1 to 0.2 microliters of N-isobutyl valine methyl ester prepared according to Examples, 2, 7 or 8, was injected into the gas stream of the gas chromatograph. The column was heated to 102° C. and the compound emerged after 7.2 minutes. Other examples are given in Table I.

EXAMPLE 11

A convenient, more direct preparation of alkyl or aryl amino acid esters employed the acid salts of the amino acid esters, to which were added crushed ice, the aldehyde selected and a non-polar solvent, such as ether, followed by rapid addition of a strong base until the solution was slightly basic. The organic layer was removed and dried. The solvent and excess aldehyde was removed by distillation to give the desired product.

More specifically, to 10g. glycine methyl ester hydrochloride was added 50g. crushed ice, 15 ml. isobutyraldehyde and 100 ml. ether followed by rapid addition of 10 percent NaOH until the solution was slightly basic, pH8 indicator being added to the acid solution. After shaking thoroughly the organic layer was removed and dried over sodium sulphate. Upon removal of the ether and excess aldehyde under reduced pressure, the product distilled to yield 10g isobutylidine glycine methyl ester boiling at 77°–78° C. at 15 mm.

Alternatively, 10g glycine methyl ester hydrochloride was dissolved in 50 ml methanol at 0°–10 C. containing an equivalent amount of sodium methoxide, and the 15 ml isobutyraldehyde, ether and sodium sulphate added. The mixture was then filtered, concentrated and distilled. Yields of above 90 percent were obtained.

It will be understood that other amino acid esters and other aldehydes may be used in this example.

EXAMPLE 12

This example illustrates manual or automatic methods of gas liquid chromatography using the alkylidine or arylidine derivatives which have been described in certain of the preceding examples. It will be understood that the following example is subject to considerable modification, as will occur to one skilled in the art.

A water solution containing a mixture of amino acid and/or amino acid derivatives was treated with an ion exchange resin in the acid form. The water was replaced by an alcohol, such as methanol, producing corresponding amino acid esters. The excess alcohol was removed and the mixture treated with an amine and an aldehyde to yield an ilidine compound, which was dried, freed from the resin and excess reagents and then reduced to the corresponding alkyl or aryl amino acid esters.

More specifically, 1g. of glycine in water solution was placed on a column containing a sulphonic acid resin in the acid form. The amino acid remained on the column, all acidic impurities passing through. The column was then treated with methanol and heated, forming the amino acid ester of glycine. A mixture of isobutyraldehyde and triethyl amine was passed through the column, removing the amino acid ester as the isobutylidine ester, identical to those described in the other examples.

TABLE I

PHYSICAL PROPERTIES OF ISOBUTYLIDINE AMINO ACID METHYL ESTERS AND THEIR REDUCTION PRODUCTS

| Amino Acid | B.P. | yield % | GLC retention Time | M.P. |
|---|---|---|---|---|
| Leucine | 1) 103–104 | 82 | | $C_{11}H_{21}O_2N$ |
| | 2) 101–102 | | 11.1(102) | $C_{11}H_{23}O_2N$ |
| Glycine | 1) 77–78 | 85 | | |
| | 2) 74–75 | | 8.9(102) | $C_7H_{13}O_2N$ |
| Norvaline | 1) 101–102 | 92 | | |
| | 2) 92–93 | | 10.5(102) | $C_{10}H_{21}O_2N$ |
| Alanine | 1) 74–75 | 89 | | $C_8H_{15}O_2N$ |
| | 2) 67–68 | | 6.35(102) | $C_8H_{17}O_2N$ |
| Norleucine | 1) 111–112 | 87 | | |
| | 2) 106–107 | | 14.5(102) | $C_{11}H_{23}O_2N$ |

| | 1) 104–105 | 89 |
|---|---|---|
| Isoleucine | 2) 96–97 | |
| a-Amino- | 1) 90–91 | 96 |
| butyric Acid | 2) 85–86 | |
| Methionine | 1) 144–145 | 93 |
| | 2) 78–79(0.1) | |
| Valine | 1) 92–93 | 75 |
| | 2) 77–78 | |
| Serine | 1) 65–66(0.1) | 84 |
| | 2) 62–63(0.1) | |
| Threonine | 1) 64–65(0.1) | 96 |
| | 2) 66–67(0.0) | |
| Phenylalanine | 1) 111–112(0.1) | 97 |
| | 2) 113–114(0.1) | |
| Lysine(mono) | 1) 124–125(0.1) | 50 |
| | 2) 119–120(0.1) | |
| Ornithine (mono) | 1) 126–127(0.1) | 60 |
| | 2) 118–120(0.1) | |
| hydroxyproline | 1) 112–114(0.1) | |
| | 2) 110–111(0.1) | |
| Tryptophan | 1) 192–193(0.1) | 88 |
| | 2) 189–190(0.1) | |
| Cysteine | 1) 73–74(0.1) | 76 |
| | 2) 76–77(0.1) | |
| Aspartic acid | 1) 85–86(0.1) | 88 |
| | 2) 75–76(0.1) | |
| Glutamic acid | 1) 100–101(0.1) | 96 |
| | 2) 91–92(0.1) | |
| Proline | 1) 88–89(0.1) | 50 |
| | 2) 82–83(0.1) | |
| Benzylidine valine methyl ester | 119–120(0.1) | 95 |
| N-Benzyl valine methyl ester | 96–97(0.1) | 85 |
| Isobutylidine leucine sec-butyl ester | 1) 133–134(15) | 95 |
| | 2) 76–77(0.1) | |
| 2-methyl butylidine valine methyl ester | 106–107(15) | 98 |
| 2-methyl butyl valine methyl ester | 104–105(15) | |
| N-isobutyl leucine M.P.: 260–262 | | |
| Trichloroethylidine valine methyl ester | 71–72(0.1) | 75 |
| Tyrosine | 1) 176–177(0.1) | 90 |
| | 2) 173–174(0.1) | |

| | |
|---|---|
| 6.25(122) | $C_{11}H_{21}O_2N$ |
| 7.8(102) | $C_9H_{19}O_2N$ |
| 12.8(150) | $C_{10}H_{21}O_2NS$ |
| 7.2(102) | $C_{10}H_{21}O_2N$ |
| | $C_8H_{17}O_3N$ |
| | $C_9H_{19}O_3N$ |
| 22.5(150) | $C_{14}H_{21}O_2N$ |
| | $C_{11}H_{22}O_2N_2$ |
| | $C_{10}H_{22}O_2N_2$ |
| | $C_{10}H_{17}O_3N$ |
| | $C_{16}H_{22}O_2N_2$ |
| 14.05(150) | $C_8H_{17}O_2NS$ |
| 10.6(150) | $C_{10}H_{19}O_4N$ |
| | $C_{11}H_{21}O_4N$ |
| 30.4(115) | $C_{10}H_{19}O_2N$ |
| | $C_{13}H_{17}O_2N$ |
| | $C_{13}H_{19}O_2N$ |
| 15.6(102) 15.9(102) | $C_{14}H_{29}O_2N$ |
| | $C_{11}H_{21}O_2N$ |
| 13.75(103) | $C_{11}H_{23}O_2N$ |
| | $C_{10}H_{21}O_2N$ |
| | $C_8H_{12}O_2NCl_3$ |
| | $C_{14}H_{19}O_3N$ |

(a) Boiling points are uncorrected and determined at 15 mm pressure (water pump) unless otherwise noted. First b.p. given is for ilidine compound, second is for N-alkyl or N-aryl compound.
(b) Yields given for ilidine compound only.
(c) Column used was Carbowax 0.02 in. × 150 ft. capillary. Carrier gas, $N_2$ at 6 ml/mi. Program: isothermal at temperatures shown. Instrument: Perkin-Elmer 800 Series Gas Chromatograph. Retention time in minutes.

TABLE II

Boiling Points of Benzylidine Amino Acid Esters

| Amino Acid | B.P.°C at 0.1 mm pressure |
|---|---|
| Norleucine | 123–124 |
| Alanine | 114–115 |
| Norvaline | 123–124 |
| Isoleucine | 119–120 |
| Methionine | 164–165 |
| Serine | 138–139 |
| Proline | 133–134 |
| Aspartic acid | 149–150 |
| Valine | 119–120 |
| Phenylalanine | 175–176 |
| Threonine | 135–136 |

What is claimed is:
1. A compound of the formula,

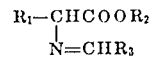

wherein $R_1$ and $R_3$ are each of the group consisting of H and an alkyl radical of three to five carbons and $R_2$ is an alkyl radical of three to five carbons.

2. Isobutylidine alpha amino acid esters wherein said ester function is of the group consisting of methyl, ethyl and butyl.

3. Trichloroethylidene valine methyl ester.

* * * * *